US007301002B1

(12) United States Patent
Cornelius et al.

(10) Patent No.: US 7,301,002 B1
(45) Date of Patent: Nov. 27, 2007

(54) SULFONATED POLYPHENYLENE POLYMERS

(75) Inventors: Christopher J. Cornelius, Albuquerque, NM (US); Cy H. Fujimoto, Albuquerque, NM (US); Michael A. Hickner, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 10/938,137

(22) Filed: Sep. 10, 2004

Related U.S. Application Data

(60) Provisional application No. 60/510,930, filed on Oct. 14, 2003.

(51) Int. Cl.
*C08G 75/00* (2006.01)
*C08G 75/20* (2006.01)
(52) U.S. Cl. .................. 528/373; 528/86; 528/397; 528/487; 524/817; 429/188; 429/208; 429/253; 428/500
(58) Field of Classification Search ............... 528/373, 528/487, 86, 347; 524/817; 429/188, 208, 429/253; 428/500
See application file for complete search history.

(56) References Cited

U.S. PATENT DOCUMENTS 4,419,486 A  12/1983  Rose 4,587,312 A  5/1986  Hergenrother
5,965,679 A  10/1999  Godschalx
6,630,518 B1  10/2003  Paronen
6,632,847 B1  10/2003  Soczka-Guth
2002/0091225 A1  7/2002  McGrath

FOREIGN PATENT DOCUMENTS

WO  WO/94/24717  10/1994
WO  WO/02/25764  3/2002
WO  WO/03/082956  10/2003

OTHER PUBLICATIONS

Marsacq et al, Fabrication—for fuel cells, 2001, Chem Abstract 135: 229352.*
Trivedi et al, Electrochemical—for triphase catalysis, Journal of the electrochemical society of India, 35(4), 243-5 (English) 1986, Chem Abstract 106: 164429.*
Ezquerra et al, Electrical conductivity—chlorosulfonic acid, Journal of Materials science letter, 4(9), 1119-21 (English) 1985, Chem Abstract 103: 187432.*
Cy H. Fujimoto, et al, Ionomeric Poly(phenylene Prepared by Diels-Alder Polymerization: Synthesis and Physical Properties of a Novel Polyelectrolyte, 2005 American Chemical Society, Published on Web May 12, 2005.

* cited by examiner

*Primary Examiner*—Duc Truong
(74) *Attorney, Agent, or Firm*—Robert D. Watson

(57) ABSTRACT

Improved sulfonated polyphenylene compositions, improved polymer electrolyte membranes and nanocomposites formed there from for use in fuel cells are described herein. The improved compositions, membranes and nanocomposites formed there from overcome limitations of Nafion® membranes.

8 Claims, 10 Drawing Sheets

SULFONATED POLYPHENYLENE POLYMERS

CROSS REFERENCE TO OTHER APPLICATIONS

This application claims benefit under 35 U.S.C. § 119(e) of provisional application No. 60/510,930 filed Oct. 14, 2003, which is incorporated by reference herein, in its entirety, for all purposes.

STATEMENT REGARDING GOVERNMENT INTEREST

This invention was made with government support under Contract No. DE-AC04-94AL85000 awarded by the United States Department of Energy's National Nuclear Security Administration. The government has certain rights in the invention.

FIELD OF THE INVENTION

The present invention relates to sulfonated polymer compositions which are suitable in particular for producing polymer electrolyte membranes, electrodes and membrane electrode assemblies for use in fuel cells, in high-performance capacitors, in dialysis equipment and in ultrafiltration and methods of synthesizing polymer compositions. More specifically, the present invention relates to sulfonated polyphenylene polymers, methods of making the same and the use of a sulfonated polyphenylene polymer composition as a polymer electrolyte membrane in hydrogen fuel cells and direct methanol fuel cells and in electrode casting solutions and electrodes.

BACKGROUND

Polymer electrolyte fuel cells (PEFCs) have great potential as an environmentally friendly energy source. Fuel cells are electrochemical energy converters which feature in particular a high level of efficiency. Among the various types of fuel cells, PEFCs feature high power density and a low weight to power ratio. The PEFC uses as its electrolyte a polymer membrane.

Fuel cells are electrochemical cells in which a free energy change resulting from a fuel oxidation reaction is converted into electrical energy. Fuel cells are attractive electrical power sources, due to their higher energy efficiency and environmental compatibility compared to the internal combustion engine. The most well-known fuel cells are those using a gaseous fuel (such as hydrogen) with a gaseous oxidant (usually pure oxygen or atmospheric oxygen), and those fuel cells using direct feed organic fuels such as methanol.

The polymer electrolyte membrane or proton exchange membrane (PEM) is an important aspect of any PEFC. PEMs are an excellent conductor of hydrogen ions. The most widely used materials to date consist of a fluorocarbon polymer backbone, similar to Teflon®, to which are attached sulfonic acid groups. The acid molecules are fixed to the polymer and cannot "leak" out, but the protons on these acid groups are free to migrate through the membrane. With the solid polymer electrolyte, electrolyte loss is not an issue with regard to stack life. The potential power generated by a fuel cell stack depends on the number and size of the individual fuel cells that comprise the stack and the surface area of the PEM.

In many fuel cells, the anode and/or cathode comprise a layer of electrically conductive, catalytically active particles (usually in a polymeric binder). A polymer electrolyte membrane is sandwiched between an anode and cathode, and the three components are sealed together to produce a single membrane electrode assembly (MEA). The anode and cathode are prepared by applying a small amount of a catalyst for example platinum (Pt) or ruthenium-platinum (Ru/Pt) in a polymeric binding to a surface that will be in contact with the PEM. Preparation of catalyst electrodes has traditionally been achieved by preparing an ink consisting of an electrocatalyst (either Pt or Ru/Pt), Nafion® polymer (5% wt. solution dispersed in lower alcohol). The ink is applied to porous carbon paper using a painting technique or directly depositing the ink upon the membrane surface or pressing it upon the membrane like a decal.

A MEA of a hydrogen fuel cell typically accepts hydrogen from a fuel gas stream that is consumed at the anode, yielding electrons to the anode and producing hydrogen ions which enter the electrolyte. The polymer electrolyte membrane allows only the hydrogen ions to pass through it to the cathode while the electrons must travel along an external circuit to the cathode thereby creating an electrical current. At the cathode, oxygen combined with electrons from the cathode and hydrogen ions from the electrolyte to produce water. The water does not dissolve in the electrolyte and is, instead, rejected from the back of the cathode into the oxidant gas stream.

For the last 30 years the industry standard for the PEM component of a hydrogen or methanol fuel cell has been membranes based on fluorine-containing polymers, for example the Nafion® material marketed by DuPont.

Nafion material is a perfluorinated sulfonic acid polymers having the following structure

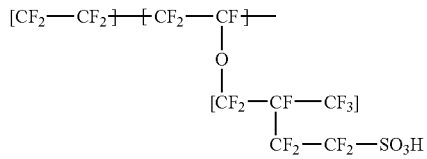

which are often used as membrane material for fuel cells and which operate at temperatures close to ambient. Further, Nafion® polymer membranes are hydrated and they have a hydrogen ionic conductivity of about $10^{-2}$ S/cm or higher.

The Nafion® membranes display adequate proton conductivity, chemical resistance, and mechanical strength. Some of the membranes disadvantages are reduced conductivity at high temperatures (>80° C.), high methanol permeability in direct methanol fuel cells, relatively thick membranes and membrane dehydration at high elevated temperatures. Further, when Nafion® membranes are used at temperatures above 80° C., they thermally deform. This deformation of the membrane prevents the Nafion® membrane from coming into sufficient contact with the electrode, thereby reducing fuel cell performance. Additionally, there is a need to reduce the costs associated with such membranes.

Another limitation of Nafion® membranes occurs in applications in methanol fuel cells. Nafion® membranes are permeable to methanol. Methanol crossover is inversely proportional to membrane thickness. Direct transport of the fuel (i.e. methanol) across the membrane to the cathode results in losses in efficiency.

Increasing the membrane thickness results in decreased methanol crossover. However, thicker membranes result in Ohmic losses and decreased fuel cell performance.

Membranes that decrease the rate of methanol crossover would allow the use of higher concentrations of methanol-water feed mixtures, which would increase catalyst efficiency, direct methanol fuel cell power out put and potentially fuel utilization.

In general, increasing the operation temperature of fuel cells is advantageous for several reasons. Higher operating temperatures in methanol fuel cells decrease the carbon monoxide poisoning of the electrocatalyst. Higher temperatures increase reaction kinetics of hydrogen oxidation on the anode and oxygen reduction on the cathode. However, as the temperature is increased, it becomes more difficult to keep the membrane hydrated. Dehydration of membranes is exacerbated by relatively thick membranes. Dehydrated membranes lose ionic conductivity and result in poor contact between fuel cell components due to shrinkage of the membrane.

Therefore, improved performance of fuel cells would be achieved by reducing the thickness of membranes and improving the humidification state of solid PEMS since water molecules can promote proton transport and thin membranes can reduce ionic resistance and Ohmic losses.

Additionally, the contact between the membrane and electrode affects the efficiency of a fuel cell. Interfacial resistance between the membrane and electrode causes Ohmic loss thereby decreasing fuel cell efficiency.

Improving the membrane-electrode contact and continuity wherein the membrane and electrode are cast from a composition having the same or similar polymer electrolytes would improve the membrane-electrode interfacial resistance.

What is needed is a composition and nanocomposites from which improved polymer electrolyte membranes, electrodes and electrode casting solutions are made and that have improved performance at temps at about 80° C. and above. Operating at these temperatures results in enhanced diffusion rates and reaction kinetics for methanol oxidation, oxygen reduction, and CO desorbtion thereby producing a more efficient fuel cell.

BRIEF SUMMARY OF THE INVENTION

Improved compositions, improved polymer electrolyte membranes and nanocomposites formed there from for use in fuel cells, high performance capacitors and dialysis equipment are described herein. The improved compositions, membranes and nanocomposites overcome limitations of Nafion® membranes.

High performance polymer electrolyte membranes and nanocomposites for use in fuel cells are produced from the sulfonated polyphenylene polymer compositions.

One aspect of the present invention provides sulfonated polyphenylene compositions from which high-performance polymer electrolyte membranes are produced.

Yet another aspect of the present invention provides sulfonated polyphenylene compositions from which high-performance sulfonated polyphenylene nanocomposites are produced.

One aspect of the present invention provides for a composition that is useful as a polymer electrolyte membrane of a hydrogen fuel cell.

One aspect of the present invention provides for an electrode casting solution comprising a sulfonated polyphenylene dispersed in a solvent in an amount up to about 20% by weight.

Another aspect of the present invention provides for an electrode for a fuel cell wherein an electrode comprises a sulfonated polyphenylene of the present invention.

Another aspect of the present invention provides for a composition that is useful as a polymer electrolyte membrane of a direct methanol fuel cell.

Still another aspect of the present invention provides for a polymer electrolyte membrane made from sulfonated polyphenylene wherein the sulfonation is inhomogenous.

Still another aspect of the present invention provides for a polymer electrolyte membrane made from sulfonated polyphenylene composition wherein the sulfonation is homogenous.

Yet another aspect of the present invention is a sulfonated polyphenylene polymer with reduced segmental mobility of polymer chains.

Another aspect of the present invention provides for a method of making sulfonated polyphenylene polymer compositions having 2 to 6 pendant sulfonic acid groups per polymer repeat. The ion exchange capacity for sulfonated polyphenylene polymers range from about 0.5 meq ($SO_3H$)/g of polymer to about 5.0 meq ($SO_3H$)/g polymer.

Another aspect of the present invention provides for a polymer electrolyte membrane with improved proton conductance over that of Nafion®117 membranes Another aspect of the present invention provides for a polymer electrolyte membrane with improved proton conductance over that of Nafion®117 membranes at temperatures in the range of about 90° C. to about 130° C.

Yet another aspect of the present invention provides for a polymer electrolyte membranes that has better mechanical properties than Nafion® 117 membranes at temperatures in the range of about 90° C. to about 130° C.

Another aspect of the present invention provides for a polymer electrolyte membrane with an improved ion exchange capacity over that of Nafion® 117 membranes.

Another aspect of the present invention provides for a polymer electrolyte membrane with a higher temperature of glass transition $T_g$ over that of Nafion® 117.

Still another aspect of the present invention provides for a composition comprising a repeat unit of Structure I.

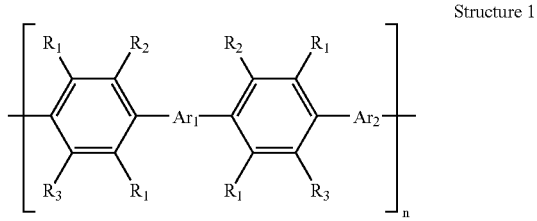

Structure 1

$R_1$, $R_2$ and $R_3$ are the same or different wherein each $R_1$, $R_2$ and $R_3$ is H or an unsubstituted or inertly substituted aromatic moiety; $Ar_1$ represents an unsubstituted or inertly substituted aromatic moiety; $Ar_2$ represents an unsubstituted or inertly substituted aromatic moiety. Aromatic moiety includes phenyl, polyaromatic and fused aromatic moieties that can be unsubstituted or inertly-substituted and include:

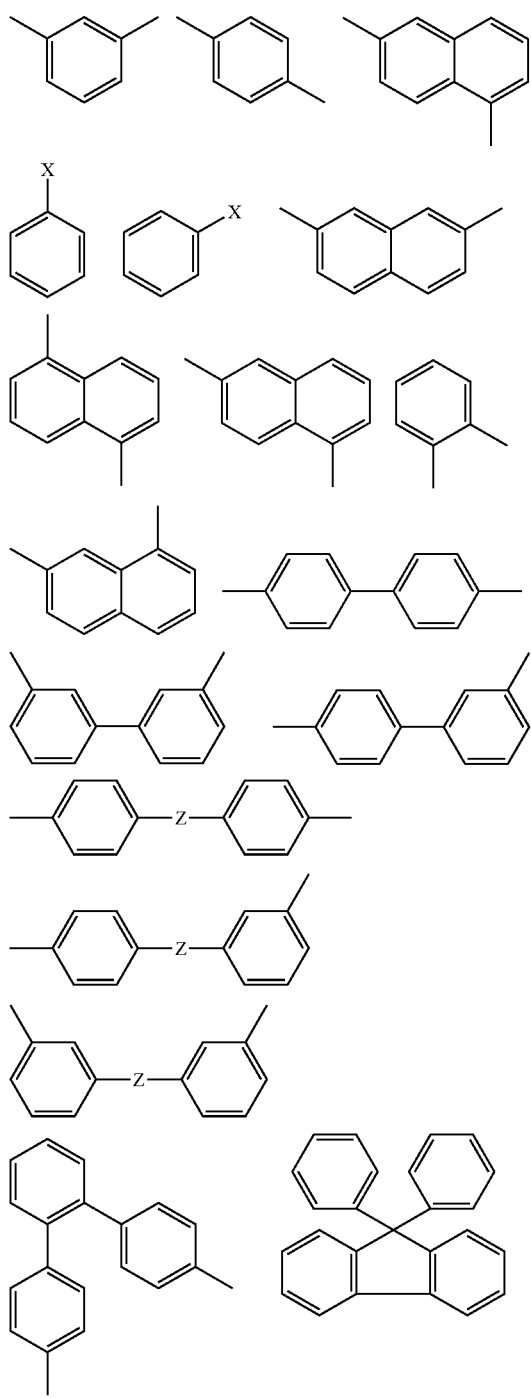

where each Z is selected from —O—, —S—, alkylene, —CF$_2$—, —CH$_2$—, —O—CF$_2$—, perfluoroalkyl, perfluoroalkoxy,

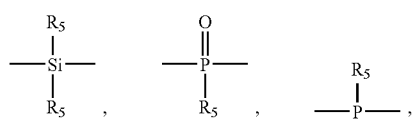

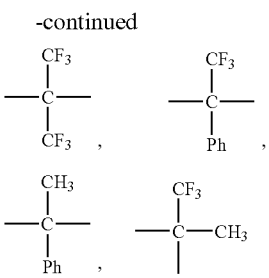

where R$_5$ is selected from —H, —CH$_3$, —CH$_2$CH$_3$, —(CH$_2$)CH$_3$, or Ph, (where Ph is phenyl). Substituent groups that do not react under Diels Alder polymerization conditions and under casting film conditions define inert substitution. Functional groups include but are not restricted to x=CH$_3$, CEt$_3$, CMe$_3$, CF$_3$, NMe$_2$, NH$_2$, F, Cl, Br, OCH$_3$, OH, OCF$_3$, O-Ph, Ph, and SO$_3$R$_5$.

Yet another aspect of the present invention provides for a polymer electrolyte membrane comprising a polyphenylene polymer wherein the polyphenylene polymer is a sulfonated polymer characterized in that it comprises repeating units having the following structure 1:

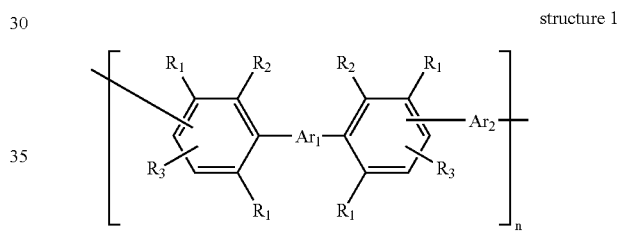

structure 1 in which R$_1$, R$_2$ and R$_3$ are the same or different, wherein each R$_1$, R$_2$ and R$_3$ are H or an unsubstituted or inertly-substituted aromatic moiety; Ar$_1$ and Ar$_2$ are the same or different, wherein each Ar$_1$ and Ar$_2$ is unsubstituted aromatic moiety or inertly substituted aromatic moiety;

wherein each aromatic moiety is selected from:

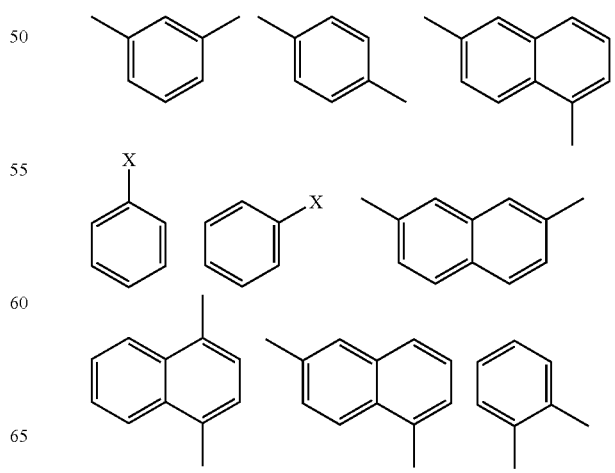

-continued

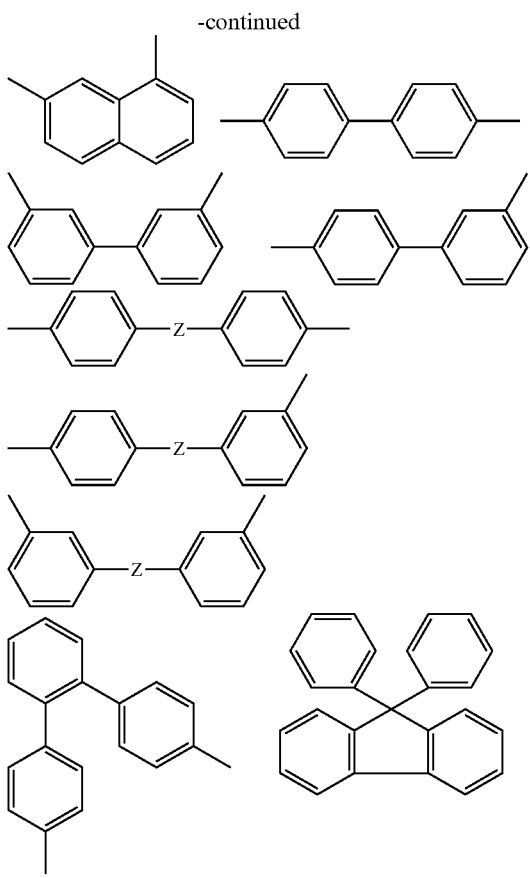

wherein each Z is selected from —O—, —S—, alkylene, —CF$_2$—, —CH$_2$—, —O—CF$_2$—, perfluoroalkyl, perfluoroalkoxy,

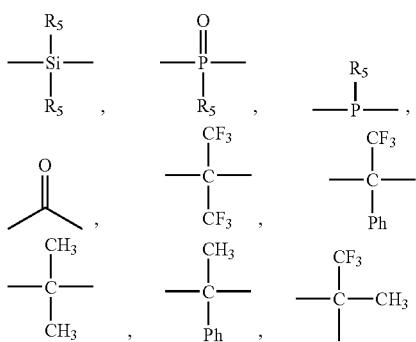

where R$_5$ is selected from —H, CH$_3$, —CH$_2$CH$_3$, —(CH$_2$)CH$_3$ or Ph. Substituent groups that do not react under Diels Alder polymerization conditions and under casting film conditions define inert substitution. Functional groups include but are not restricted to x=CH$_3$, CEt$_3$, CMe$_3$, CF$_3$, NMe$_2$, NH$_2$, F, Cl, Br, OCH$_3$, OH, OCF$_3$, O-Ph, Ph, and SO$_3$R$_5$. Two or more repeat units are polymerized together to form the polymer. According to one embodiment, the number of repeat units (n) range from 2–50. According to another embodiment the number of repeat units (n) ranges from 50–200. According to yet another embodiment, the number of repeat units (n) range from 200–1000. According to yet another embodiment, the number of repeat units (n) are above 1000.

Yet another aspect of the present invention provides for an electrode casting solution comprising a sulfonated polyphenylene polymer composition as disclosed herein.

Yet another embodiment of the present invention relates to a membrane electrode assembly comprising an anode; a cathode; and a polymer electrolyte membrane positioned between the anode and cathode wherein at least one of the anode, cathode and polymer electrolyte membrane comprises a sulfonated polyphenylene polymer composition as disclosed herein.

Still another embodiment of the present invention relates to a fuel cell comprising a membrane electrode assembly wherein at least one of the anode, cathode and polymer electrolyte membrane comprises a sulfonated polyphenylene polymer composition as disclosed herein.

BRIEF DESCRIPTION OF THE DRAWINGS

Additional objects and advantages of the present invention will be apparent in the following detailed description read in conjunction with the accompanying drawing figures.

DETAILED DESCRIPTION

Although described herein with respect to preferred embodiments, the present invention is not meant to be so limited, and other modifications and embodiments that fall within the scope of the present invention will be readily apparent to those of skill in the art. The descriptions are illustrative only and should not be viewed as limiting.

For ease of explanation, the present invention is explained in terms of polyphenylene polymer compositions (DAPP) and sulfonated polyphenylene polymer compositions (SDAPP). According to one embodiment of the invention, polyphenylenes are produced through Diels Alder (DA) reactions.

Figure 1:
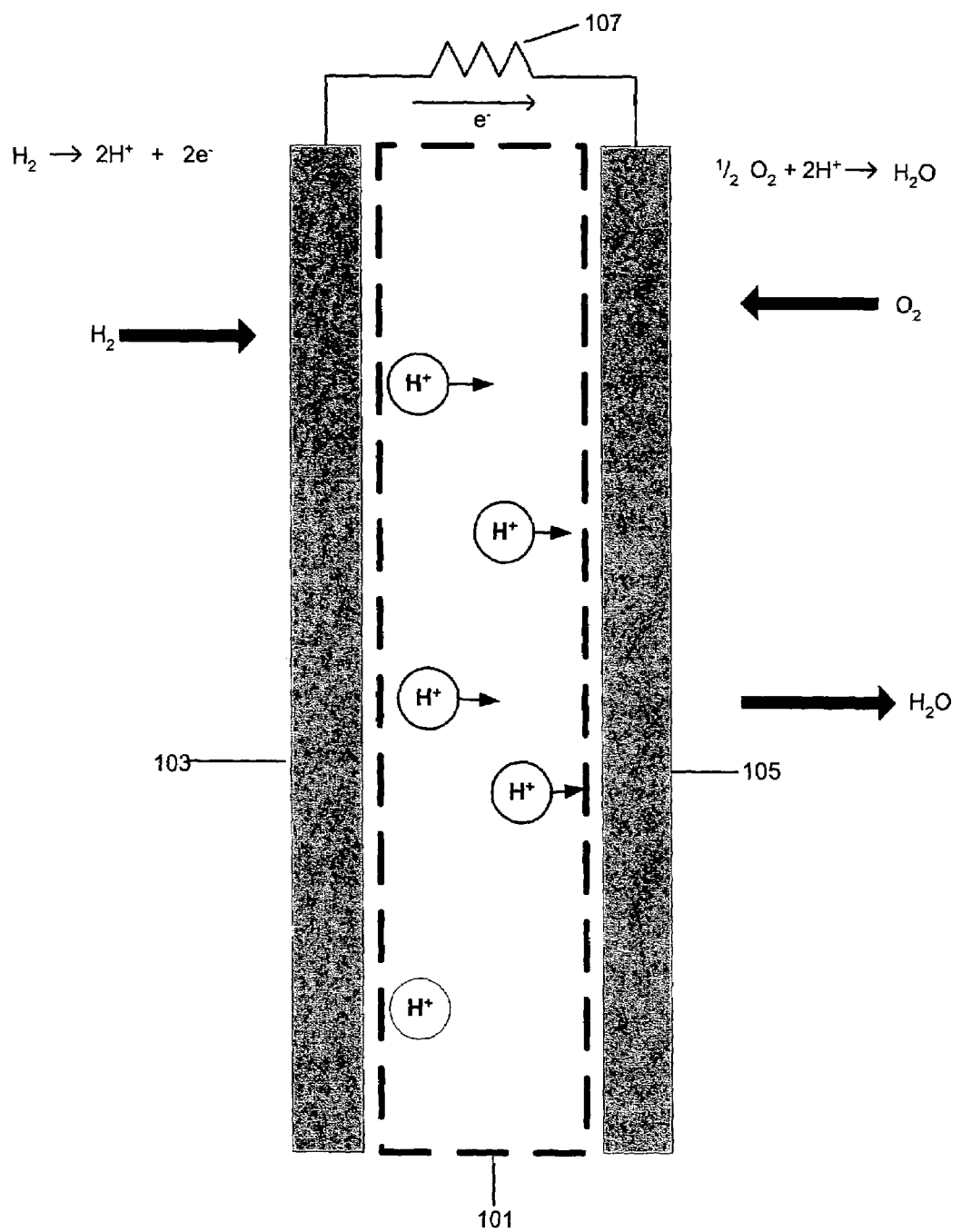
FIG. 1 illustrates a membrane electrode assembly according to one embodiment of the present invention.

Referring now to FIG. 1, a membrane electrode assembly according to one embodiment of the present invention is illustrated. A membrane 101 is positioned between an anode 103 and a cathode 105 where for example at least one of the membrane, anode or cathode is formed of a sulfonated polyphenylene polymer as described in the present invention. At the anode, 103, hydrogen molecules give up electrons, forming hydrogen ions. This process is made possible by the catalyst at the anode for example Platinum or Ruthenium-Platinum. The polymer electrolyte membrane 101 allows protons to flow through but not electrons. As a result, the hydrogen ions flow directly through the polymer electrolyte membrane to the cathode 105, while the electrons flow through an external circuit 107. As they travel to the cathode 105 through the external circuit 107, the electrons produce electrical current. This current can perform useful work by powering any electrical device. At the cathode 105, the electrons and hydrogen ions combine with oxygen to form water.

A polymer electrolyte membrane of FIG. 1 may be formed by casting an about 20% solution of sulfonated polyphenylene polymer on a clean glass surface which may be coated with hydrophobic groups to produce a film according to one embodiment of the present invention. According to another embodiment of the present invention, the films are further "activated" through post polymerization protonation of the sufonly groups. One activation procedure includes immersing the film in about 2.0 M $H_2SO_4$ for about 24 hours. The film is rinsed in deionized water baths for about an additional 24 hours to remove most of the inorganic salts. Yet another activation procedure includes immersing the films in $H_2SO_4$ bath for 1 hour at 100° C. followed by a rinse in an about 100° C. for about 1 hour. The second procedure increases water uptake levels and proton conductivity by thermally enlarging the hydrophilic domain compared to procedure 1. The sulfonated polyphenylene may be entirely in the acid form, meaning the sulfonic groups are protonated or alternatively, the sulfonated polyphenylene may be entirely in the sodium form where all the sulfonic groups have sodium cations as counter ions or some combination thereof. However other cations may be used and will be obvious to those of ordinary skill in the art.

The morphology of the parent polyphenylene provides for up to six (6) sulfonic acid moieties to attach to carbons of the aromatic moieties attached to the phenylene backbone of the repeat units (for example when the aromatic moieties are phenyl groups). The number of repeat units in a polymer ranges from 2 or more where n preferably ranges from about 130 to about 300.

Polyphenylene polymers and sulfonated polyphenylene polymers provide for improved thermal stability, while maintaining organic solubility making it possible to form films with improved mechanical properties when compared to Nafion®117 films from Dupont.

According to another embodiment of the present invention a composition comprising polyphenylene repeat units of structure I is polymerized to form polyphenylene polymers of between about 130–3000 repeat units. Structure I is synthesized by various methods including Diels Alder reactions for example where bis-tetraphenylcyclopetadienone reacts with p-Bis(ethynyl)benzene to yield carbon monoxide and polyphenylene. Alternatively polyphenylene and carbon dioxide are produced by the condensation of 2-pyrone with p-Bis(ethynyl)benzene.

The repeat unit contains $R_1$, $R_2$ and $R_3$ which are the same or different, wherein each $R_1$, $R_2$ and $R_3$ is H or an unsubstituted or inertly-substituted aromatic moiety. $Ar_1$ represents an unsubstituted or inertly substituted aromatic moiety; $Ar_2$ represents an unsubstituted or inertly substituted aromatic moiety.

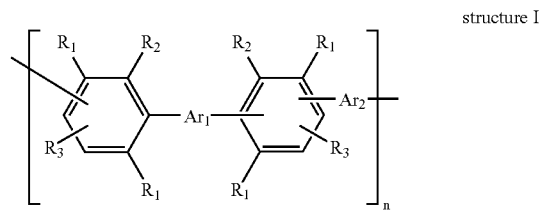

structure I

Aromatic moiety includes phenyl polyaromatic and fused aromatic moieties that can be unsubstituted or inertly-substituted and include:

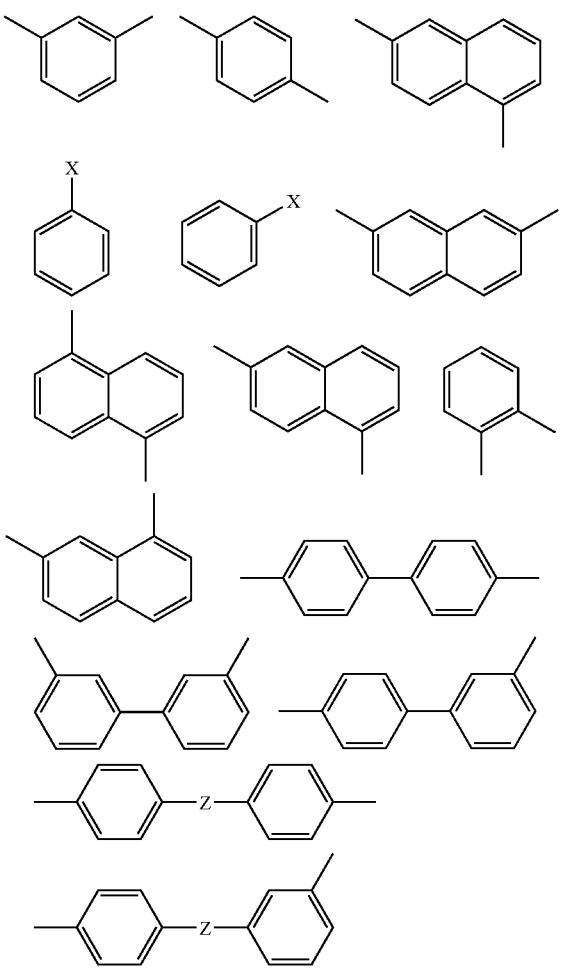

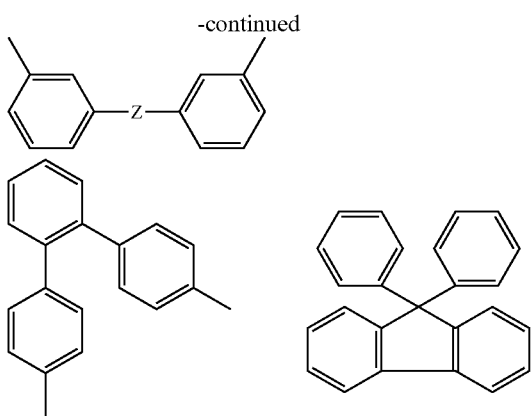

where each Z is selected from —O—, —S—, alkylene, —CF$_2$—, —CH$_2$—, —O—CF$_2$—, perfluoroalkyl, perfluoroalkoxy,

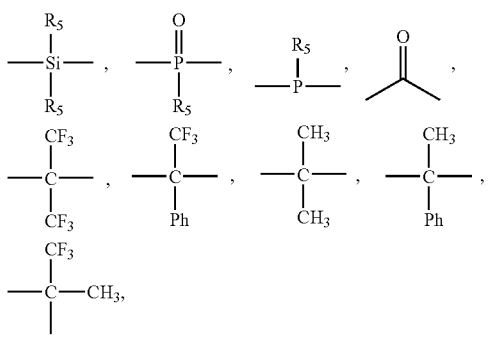

where R$_5$ may be —H, CH$_3$, —CH$_2$CH$_3$, —(CH$_2$)CH$_3$ or Ph, (where Ph is phenyl). Substituent groups that do not react under Diels Alder polymerization conditions and under casting film conditions define inert substitution. Functional groups include but are not restricted to x=CH$_3$, CEt$_3$, CMe$_3$, CF$_3$, NMe$_2$, NH$_2$, F, Cl, Br, OCH$_3$, OH, OCF$_3$, O-Ph, Ph, and SO$_3$R$_5$.

For example, synthesis of DAPPs are performed using a modification of the method known in the art wherein to bis-tetracyclone (50.0 g; 72.4 mmol) and 1,4-diethynylbenzene (9.13 g; 72.4 mmol) in a 500 mL Schlenk flash, diphenyl ether (250 mL) is added and the resulting mixture is frozen in an ice bath. The mixture is freeze-thaw degassed (3×) before heating under argon (1 atm) at 180° C. for 24 h. Periodically, carbon monoxide is vented to avoid overpressurization of the reaction flask. Subsequently, additional diethynylbenzene (0.10 g; 0.8 mmol) is added to the viscous slurry and the mixture is stirred for an additional 12 h at 180° C. The reaction vessel is then cooled to room temperature and its contents are diluted with toluene (300 mL). The polymer is precipitated by dropwise addition of the solution to 1000 mL of acetone. This dilution in toluene and precipitation in acetone is repeated and the resultant white solid is dried in a vacuum oven for 12 h at 80° C., 48 h at 230° C., and 24 h at room temperature. A 96% yield (52 g collected) of a tough, yellow solid is obtained. According to one embodiment of the present invention, the DAPP polymer is polymerized in the absence of a metal catalyst.

In one example of a sulfonation, DAPP (7.02 g) is added to a flame dried, 500 mL three-neck, round-bottom flask under argon and dissolved in methylene chloride (6% solution by weight). The solution is cooled to −50° C. (dry ice/acetonitrile) and chlorosulfonic acid (4.30 g, 36.9 mmol) (diluted in chloroform 20 mL) is added dropwise though an addition funnel over 15 minutes while being vigorously stirred with a mechanical stirrer under an argon atmosphere. This amount of chlorosulfonic acid gives a 4:1 ratio of acid to polymer repeat unit. Other ratios of sulfonating agent to polymer repeat unit are prepared to attain polymers with various ion exchange capacities. A mixture darkened from bright yellow to black during chlorosulfonic acid addition. After 30 minutes the reaction is warmed to room temperature at which point a dark solid precipitated. The organic solvent was decanted and to the remaining solid was added 300 mL of a 0.5 M solution of NaOH that was allowed to react at room temperature for 12 h. The slurry is then heated for 4 h at 80° C. to ensure sulfonyl chloride conversion. The off-white solid was Soxhlet extracted with de-ionized water for 48 h and dried in a vacuum oven at 100° C. for 48 h to obtain light yellow solid (9.52 g). $_1$H NMR (D-DMSO): δ(ppm)=broad signal 6.35–7.22 (peaks at 7.19, 7.09, 6.95, 6.88, 6.64, 6.54). $_{13}$C NMR (DMSO-d$_6$): δ (ppm)=broad signal 138–141 (peak at 139) broad signal 131–126 (peaks at 126.9, 128.7, 129.5, 131.0).

The sodium salt of the sulfonated polymer is dissolved in DMAc (10% weight solution) and filtered though a 2 μm syringe filter (glass microfiber filter). The solution is cast onto a clean glass plate in an oven at 90° C. under N$_2$. After 20 h, the film is removed from the glass plate and immersed in de-ionized water (1 L, 18 M•) for one hour at 100° C. to extract any residual DMAc. The resultant film is then converted into the acid (proton) form by immersion in 2.0 M H$_2$SO$_4$ at 100° C. for one hour. The film is then rinsed thoroughly with de-ionized water and then soaked in deionized water (18 M•) at 100° C. for another hour to remove any residual acid. The films are stored in de-ionized water until used.

According to one embodiment of the present invention, a 6 wt % polymer solution of DAPP in methylene chloride is homogeneously sulfonated in situ with chlorosulfonic acid. Sulfonating agents include sulfuric acid, fuming sulfuric acid and sulfur trioxide, or a mixture of sulfuric acid and thionyl chloride but are not limited thereto.

Activation of the polyphenylene(s) for proton conductivity is accomplished by using a variety of activating agents. The degree of sulfonation and the homogeneity of sulfonation between repeat units are controlled by varying the concentration of the sulfonating agent, varying the temperature of the reaction and whether a polyphenylene polymer is dissolved at the time of sulfonation. Pendant side chains of sulfonyl groups are attached to a carbon atom of the lateral phenyl ring. According to one embodiment of the present invention, the attachment of the pendant groups are at the para position from attachment to the backbone. According to yet another embodiment of the present invention, the attachment of the pendant groups are at the meta position from attachment to the backbone.

The following examples provided are intended for illustrative purposes and do not limit the scope of the invention since other suitable sulfonating agents will be apparent to one of ordinary skill in the art.

EXAMPLE I

One method for sulfonating a polyphenyl backbone with the illustrative parent polyphenylene structure is illustrated in scheme 1

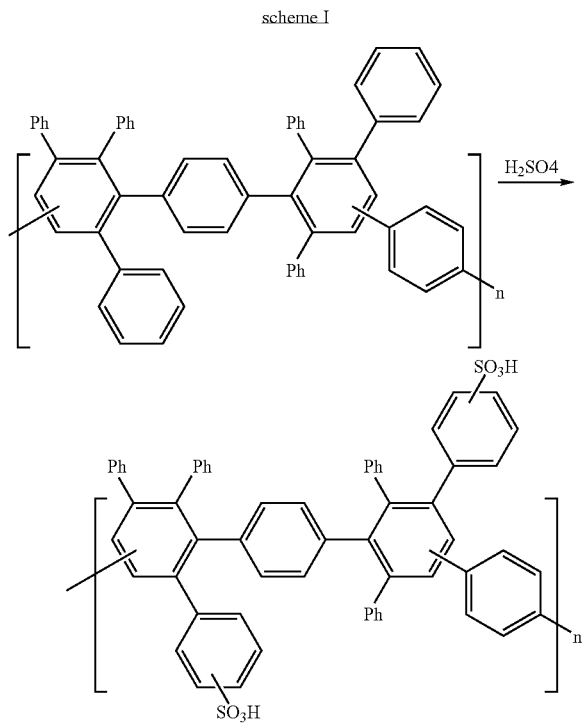

The sulfonating agent is added to solid polyphenylene polymer. The ration of acid to polymer repeat unit is varied to yield polymers with various ion exchange capacities. Examples of sulfonating agents include sulfuric acid, fuming sulfuric acid, sulfur trioxide but are not limited thereto. Use of this method can result in inhomogenous sulfonation since only the face of the polymer is in contact with the sulfonating agent. Alternatively, sulfonation can proceed by dissolving the polymer in a chlorinated hydrocarbon, followed by the addition of the sulfonating agent. This results in sulfonation that occurs homogenously through the polymer backbone since each repeat group has an equal probability of reacting with the sulfonating agent. Chlorosulfonic acid sulfonation at elevated temperatures results in a homogenous sulfonation of each polymer unit. Varying the concentration of the sulfonating agent varies the degree of sulfonic acid pendant groups per polymer repeat unit.

Polyphenylenes that are not 100% sulfonated are soluble in a variety of polar, aprotic solvents such as as N,N-Dimethylacetamide (DMAC), dimethylformamide (DMF), dimethylsulfoxide (DMSO) and N-Methylpyrrolidone (NMP). Fully sulfonated polyphenylenes are at least partially insoluble in a variety of polar, aprotic solvents such as DMAC, DMF, DMSO and NMP and as such can form a hydrogel. The sulfonated polyphenylenes hydrogels are useful as ion exchange resins for desalination of water and chelation of inorganic materials that would exchange into the hydrogel.

The degree of sulfonation per repeat polymer unit is controlled by the concentration of sulfonating agent. Manipulation of temperature and concentration of the sulfonating agent yields sulfonated polyphenylene polymer compositions having morphology that allows for increased ion exchange capacity, membrane hydration, improved physical properties at temperatures above 80° C. and limited methanol (MeOH) fuel crossover when compared to Nafion® compositions.

A DAPP and SDAPP backbone structure provides decreased segmental mobility thereby producing a relatively stiff backbone structure or rod-like structure. The sulfonic acid pendant groups are distributed throughout the polymer. The overall morphology of the SDAPP provides for a rod-like structure wherein the acid groups form proton channels. The rod-like structure of the DAPP and SDAPP contributes to the improved water retention properties of the materials, the decreased low-carbon fuel permeability and the improved conductance thereby leading to increased fuel cell efficiency over that of Nafion®117 materials.

According to one embodiment of the present invention films are cast upon a clean glass surface from about a 20 wt % solution of polymer. The surface of the glass can be coated with hydrophobic groups. The resulting film is transparent and flexible.

According to another embodiment of the present invention films are treated with $H_2SO_4$ for about 24 hours. The treated films are bathed in a bath of deionized water for about 24 hours to remove any inorganic salts. The treated films are further treated to $H_2SO_4$ at about 100° C. for about one hour. Inorganic salts deposited on the films are removed by bathing the films in deionized water at about 100° C. for about 1 hour. In an alternative embodiment the second wash step is omitted.

Electrochemical Impedance Spectroscopy (EIS) was used to collect proton conductivity data for polyphenylene polymer materials and sulfonated polyphenylene polymer material. Films are measured by four probe EIS using a Solartron 1260 frequency analyzer and a Solartron 1287 potentiostat and a test cell designed to measure the materials impedance by the point method. The resistance of each film was measured while totally submerged in deionized-water during each measurement at 25° C. Proton conductivity was calculated using Eq. 1

$$\Sigma = d/(A \cdot R) \qquad \text{Equation 1}$$

where d is the electrode distance (0.5 cm), A is the cross sectional area of the film, and R is the film resistance. The conductivities are determined in hydrated films by AC impedance spectroscopy over a frequency range of $1 \times 10^3$ Hz to $1 \times 10^6$ Hz.

EXAMPLE II

Figure 2:
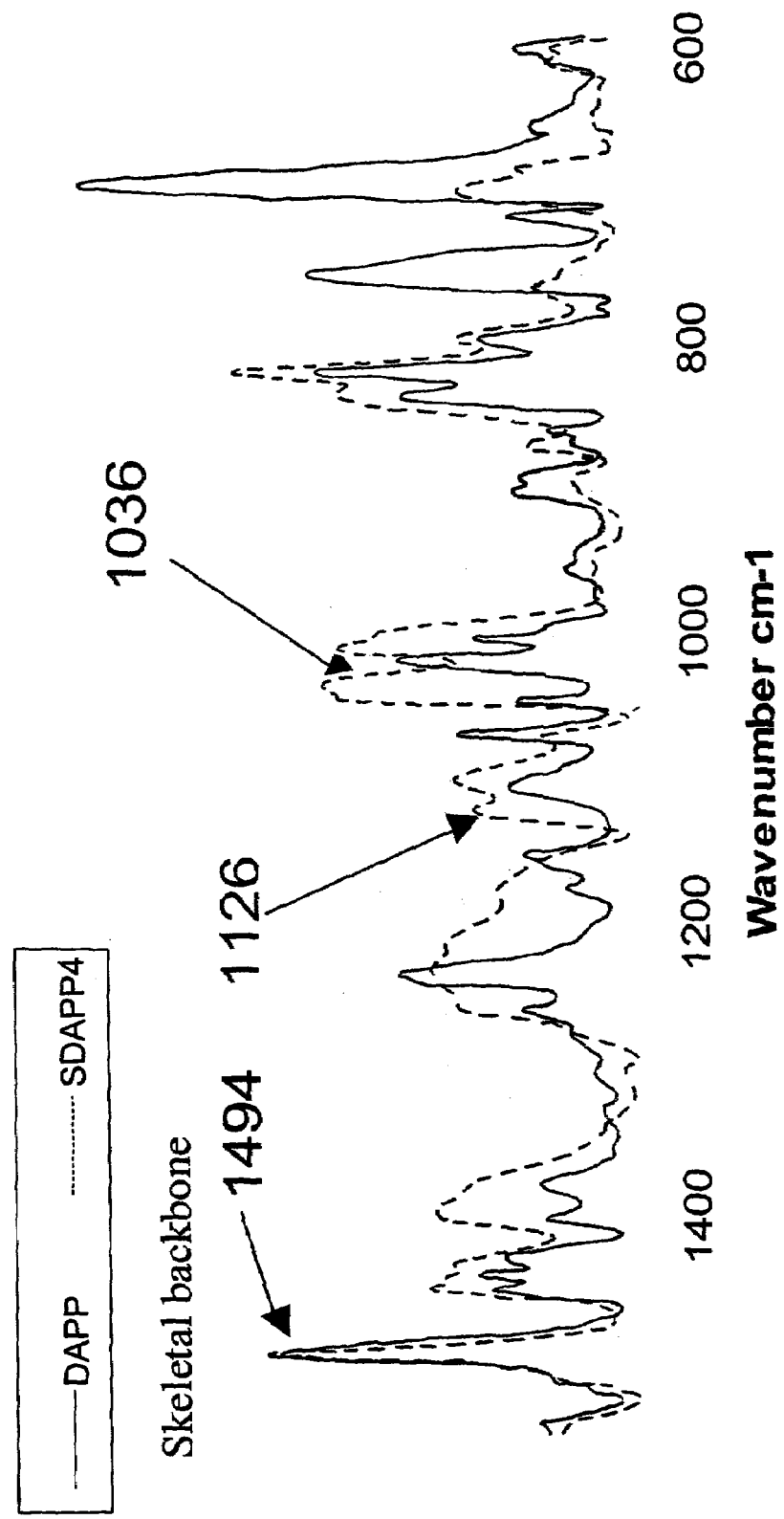
FIG. 2 illustrates sulfonic acid characterization by IR spectroscopy for DAPP and SDAPP materials according to one embodiment of the present invention.

Sulfonated polyphenylene polymer materials are analyzed by infrared spectroscopy. Referring now to FIG. 2, peaks at 1036 $cm^{-1}$ and 1126 $cm^{-1}$ correspond to sulfonic acid stretching frequencies while the intensity of the peak corresponds to the absolute amount of sulfonic acid pendant groups. Peak at 1494 $cm^{-1}$ is the reference peak which is present in the parent and the sulfonated polymer.

Figure 3:
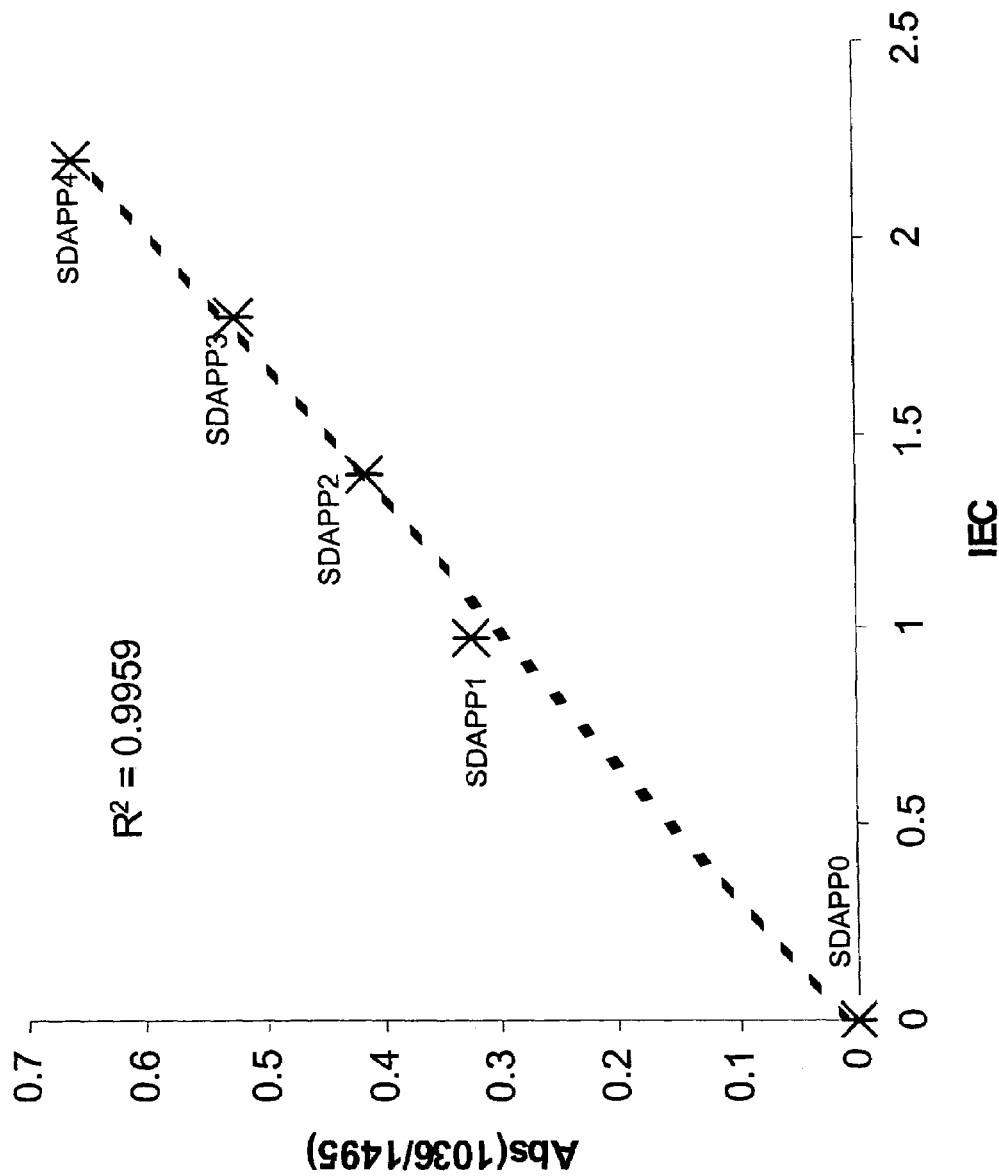
FIG. 3 illustrates sulfonic acid characterization by IR spectroscopy in relation to ion exchange capacity of SDAPP materials according to one embodiment of the present invention.

The ion exchange capacity of membranes increase with an increase in the sulfonic acid content of each polymer unit. Referring now to FIG. 3, the absorbance ratio of the sulfonic acid stretching frequency at 1036 $cm^{-1}$ is divided by the reference peak at 1494 $cm^{-1}$ for an SDAPP polymer composition. This ratio is plotted against the ion exchange capacity (meq/g) as measured for SDAPP membranes. The absorbance ration of 1036/1494 $cm^{-1}$ increases with an increase in the ion exchange capacity. Ion exchange capacity is determined by treating 0.2 g of acidified and dried polymer with 10 ml of 0.1 M NaOH and stirring for 24 hours. The sample is then filtered and titrated against 0.01 M HCl Shown in Table I, a comparison of proton conductivity, ion exchange capacity (IEC) and water uptake for sulfonated polyphenylene (SDAPP) materials SDAPP1, SDAPP2, SDAPP3, and SDAPP4 is illustrated.

TABLE I

| Sample | IEC (meq/g) | Water uptake (weight %) | Conductivity (mS/cm) |
|---|---|---|---|
| SDAPP1 | 0.98 | 21 | 13 |
| SDAPP2 | 1.4 | 36 | 49 |
| SDAPP3 | 1.8 | 75 | 87 |
| SDAPP4 | 2.2 | 137 | 123 |

As the sulfonation level increases the ion exchange capacity also increases since the ion exchange capacity is proportional to the sulfonic acid pendant groups attached to the lateral phenyl groups of polyphenylene backbone structure of the polymer. The water uptake (weight %) increases with increased conductivity and ion exchange capacity. Water uptake is measured by immersing the acidified films in deionized water for about 24 hours at about 25° C. The films are them blotted dry and weighted ($W_s$). The films were then dried and weighted ($W_d$). Water uptake=[$W_s$-$W_d$/$W_d$]×100%. The films displayed proton conductivities ranging from 8–115 mS/cm while still maintaining mechanical stability.

Figure 4:
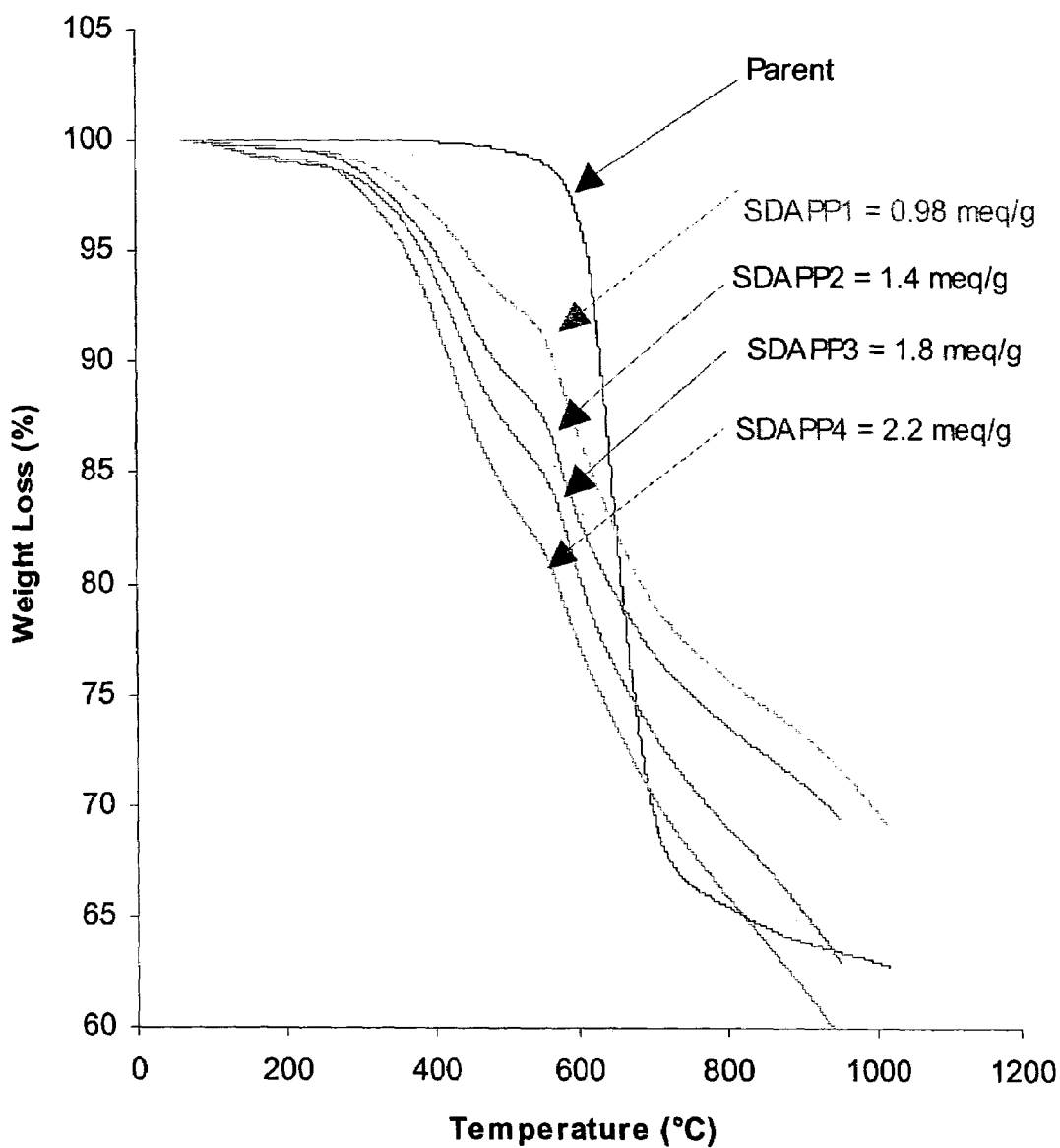
FIG. 4 illustrates thermalgravametric (TGA) analysis of DAPP and SDAPP materials according to one embodiment of the present invention.

Thermogravametric analysis of DAPP is compared to the thermogravametric analysis of SDAPP1, SDAPP2, SDAPP3, and SDAPP4 which is illustrated in FIG. 4. Referring now to FIG. 4, the weight loss (%) is plotted against a range of temperatures. The DAPP structure has a decomposition temperature of about 572° C. As the ion exchange capacity of the different SDAPP polymer compositions increase there is a decrease in the temperature at which SDAPP polymers decompose. The decrease in decomposition temperature is related to the increase in the sulfonic acid content.

EXAMPLE III

Figure 5:
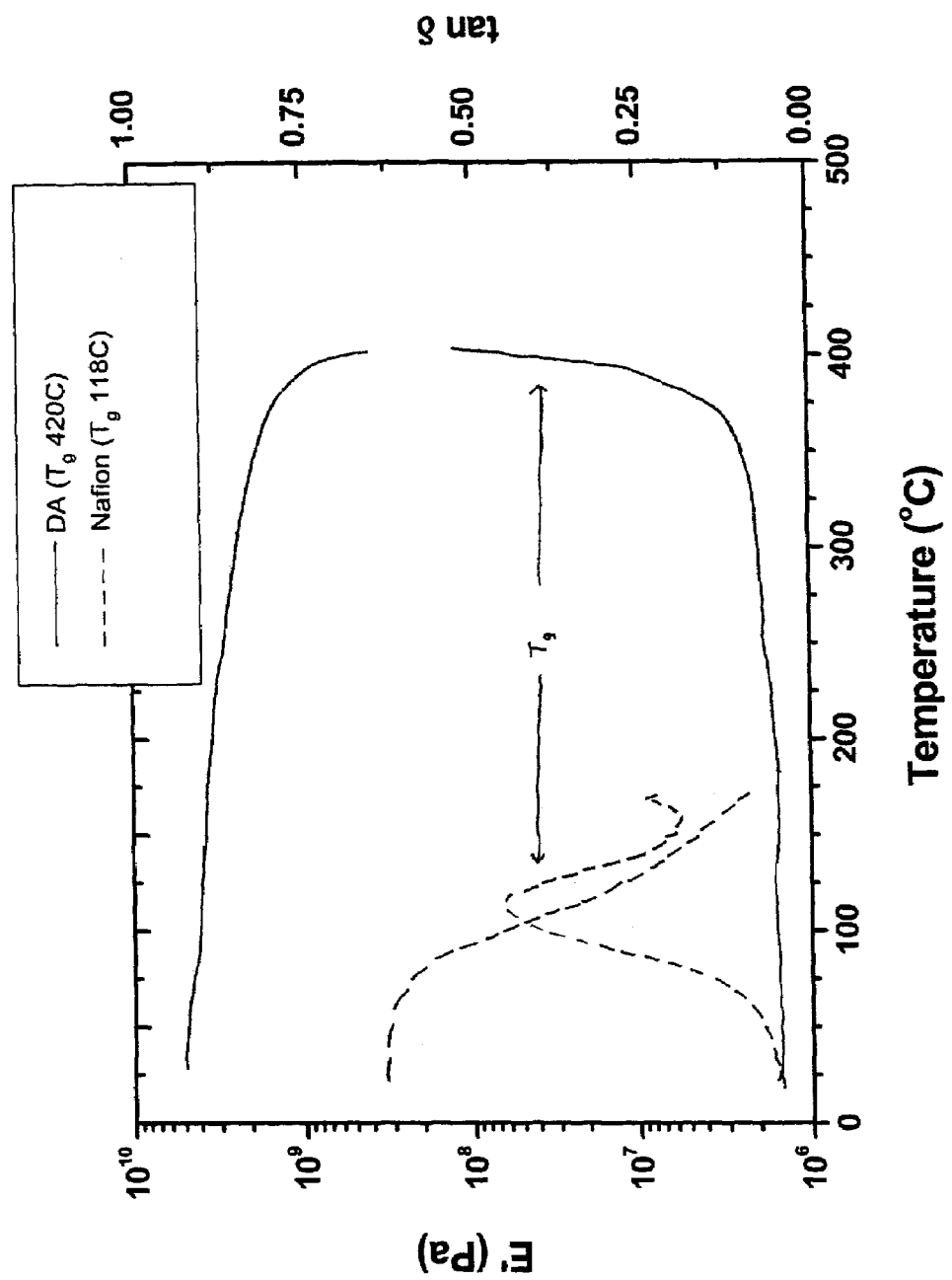
FIG. 5 illustrates physical properties of DAPP materials through a comparison of Nafion®117 and DAPP storage modulus and Tg according to one embodiment of the present invention.

Referring now to FIG. 5, the storage modulus E'(Pa) and glass transition state ($T_g$) are summarized for Nation® and DAPP as illustrated in scheme I over the temperature range as shown. A $T_g$ of 418° C. is observed for DAPP and a $T_g$ of 118° C. is observed for Nafion® 117. A significant difference between the DAPP system and the Nafion® 117 beyond the $T_g$ is the order of magnitude difference in E'. Polyphenylene polymer materials have an improved working temperature a compared to Nafion® 117 materials.

Figure 6:
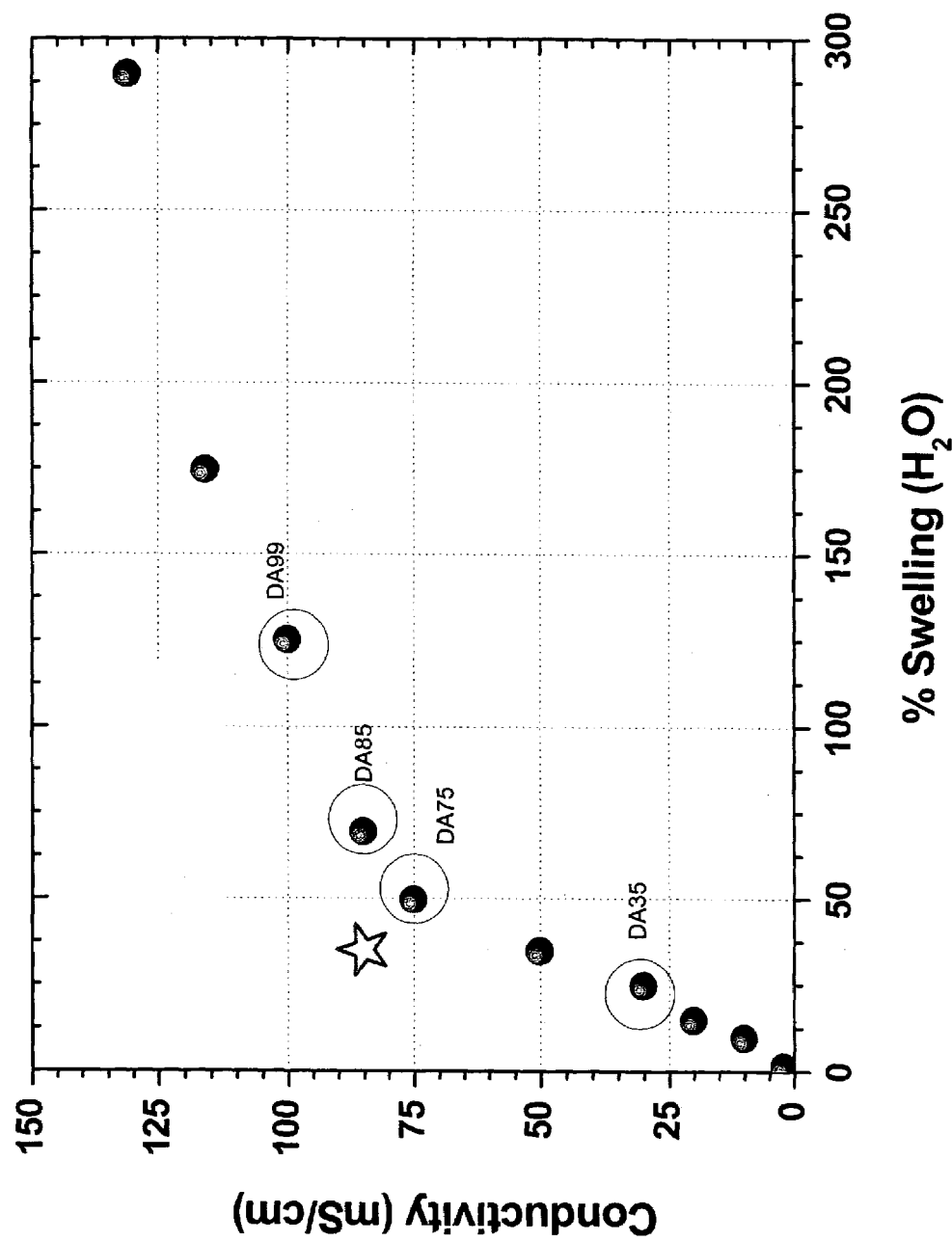
FIG. 6 illustrates physical properties of SDAPP materials through a comparison with Nafion® 117 materials for proton conductivity as a function of the % swelling of the membranes in water according to one embodiment of the present invention.

Referring now to FIG. 6, swelling experiments were performed on a series of SDAPP materials and compared to Nafion® 117. The wt % swelling is calculated according to formula 4:

$$wt\ \%\ Swelling = \frac{m_{Final(wet)} - m_{Initial(dry)}}{m_{Initial(dry)}} \cdot 100\% \quad (4)$$

Swelling was considered complete after immersing the samples in deionized water at 25° C. and allowing them to equilibrate for 24 hours. SDAPP films having conductivity (Ms/cm) at about 30, 75, 85 and 99 (circled dots) are annotated as DA30, DA75, DA85 and DA99. DA30, DA75, DA85 and DA99 are further examined and compared to Nafion® 117 membranes (star).

Figure 7:
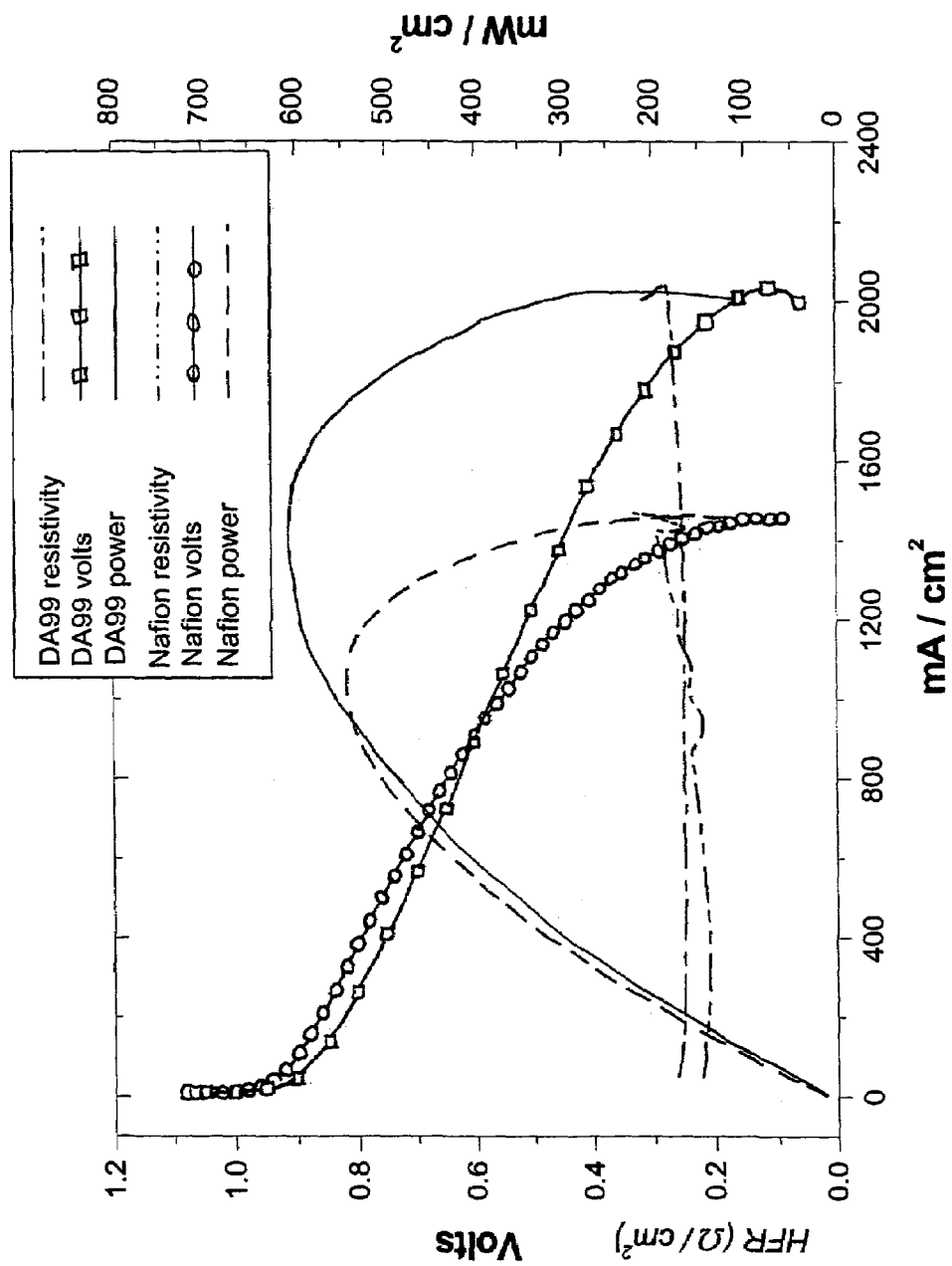
FIG. 7 illustrates polarization and power curves of the SDAPP materials in hydrogen fuel cell as compared to Nafion®117 membranes according to one embodiment of the present invention.

Referring now to FIG. 7, sulfonated polyphenylene polymer membranes are further characterized by comparison of polarization and power curves between DA99 membrane (of about 2.4 mil. thickness) and Nafion® 117 (1100 g/meq and 7 mil thickness) membrane in a $H_2$ fuel cell. As is illustrated, DA99 has a higher current density than Nafion® 117 membrane when tested under like conditions. Nafion® 117 membranes demonstrate a maximum of about 540 mW/cm$^2$ at about 1090 mA/cm$^2$. DA99 membranes demonstrate a maximum of about 610 mW/cm$^2$ at about 1360 mA/cm$^2$. The fuel cell size was about 5 cm$^2$ having the following conditions: 80° C., $H_2$ & $O_2$ at 400 sccm & 80° C., 20 psig.

Figure 8:
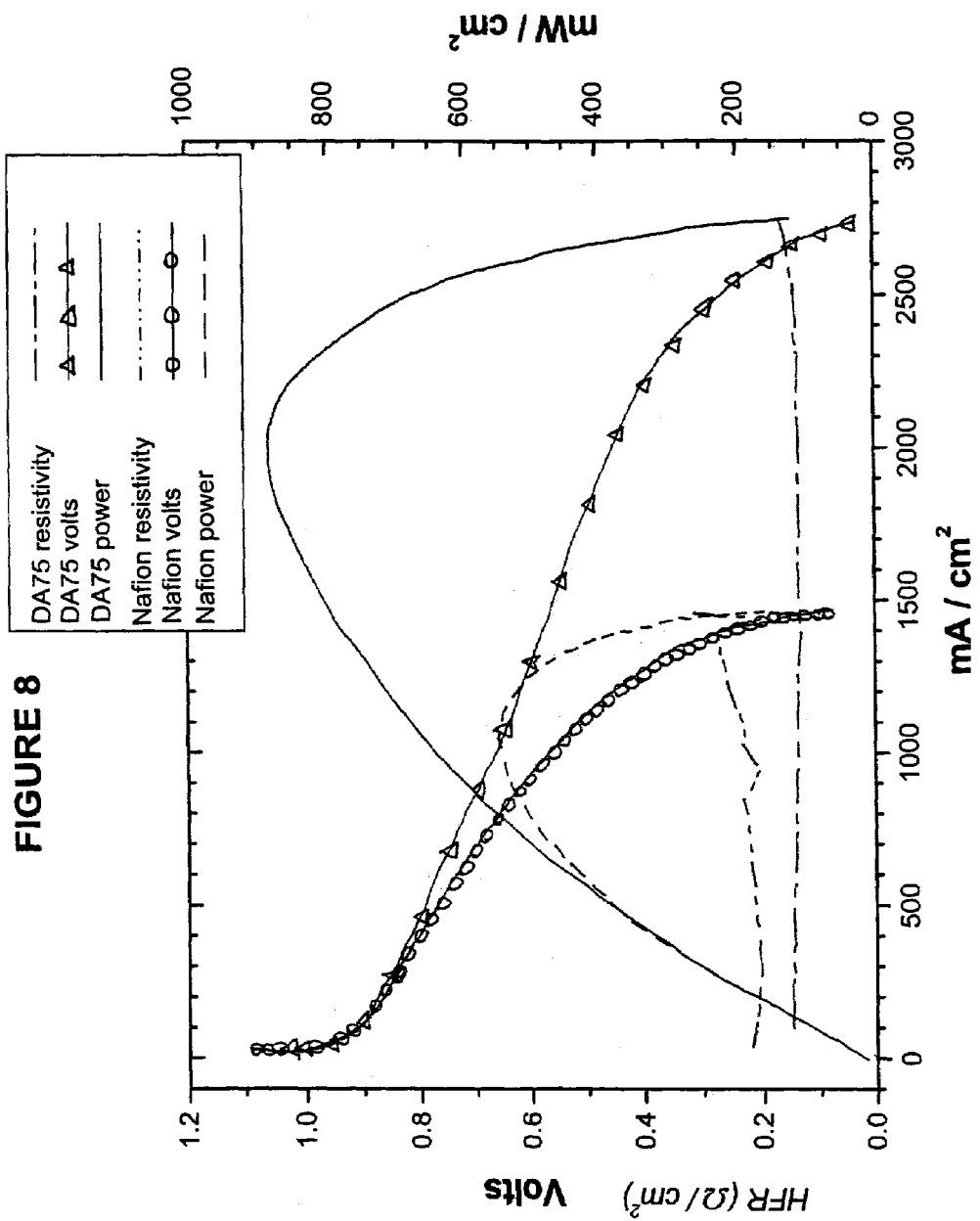
FIG. 8 illustrates polarization and power curves of the SDAPP materials in a hydrogen fuel cell as compared to Nafion®117 membranes according to one embodiment of the present invention.

Referring now to FIG. 8, sulfonated polyphenylene polymer membranes are further characterized by comparison of polarization and power curve between DA75 membrane (of about 1.2 mil. thickness) and Nafion® 117 membrane (of about 7 mil. thickness) in a $H_2$ fuel cell. As is illustrated, DA75 has a higher current density than Nafion® 117 membrane when tested under the following conditions. Nafion® 117 membranes are tested at 80° C., $H_2$ & $O_2$ at 400 sccm & 80° C., 20 psig. DA75 membranes are tested at 80° C., $H_2$ & $O_2$ at 500 sccm & 80° C., 20 psig: for a fuel cell of about 5 cm$^2$. The results demonstrate that DA75 has an improved current density profile over that of Nafion®117 having a maximum of about 898 mW/cm$^2$ at about 2020 mA/cm$^2$. Nafion® 117 membrane has a maximum of about 540 mW/cm$^2$ at about 1090 mA/cm$^2$.

Figure 9:
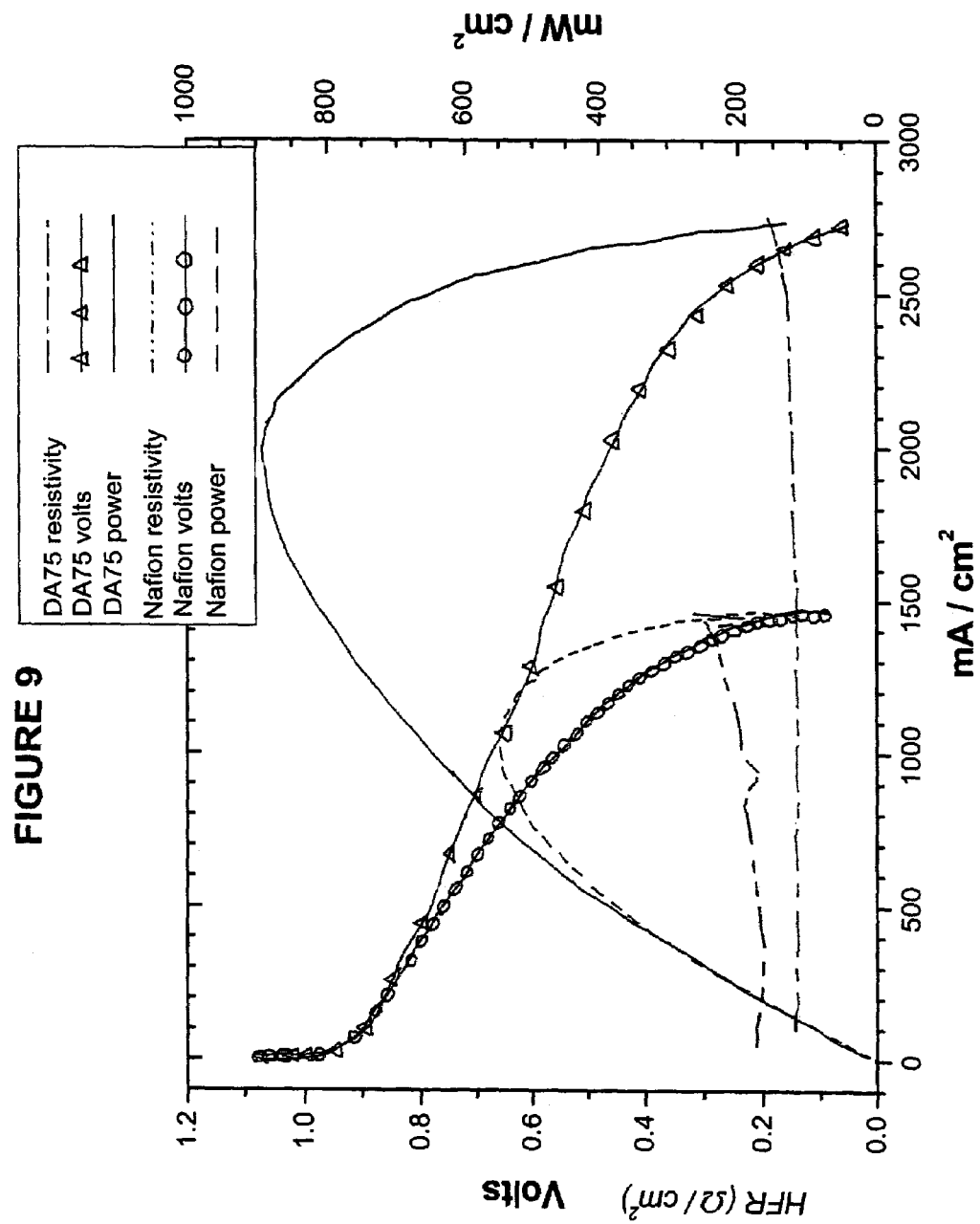
FIG. 9 illustrates polarization and power curves of the SDAPP materials in a methanol fuel cell as compared to Nafion®117 membranes according to one embodiment of the present invention.

Referring now to FIG. 9, a comparison of the polarization and power curve between DA75 membrane (of about 1.2 mil. thickness) and Nafion® 117 membrane (of about 7 mil. thickness) in a $CH_3OH$ fuel cell is illustrated. As is illustrated, DA75 has a higher current density than Nafion 117 membrane when tested under identical conditions. Nafion® 117 membrane demonstrates a maximum of about 110 mW/cm$^2$ at about 375 mA/cm$^2$. DA75 demonstrates a maximum of about 139 mW/cm$^2$ at about 562 mA/cm$^2$. The fuel cell size was about 5 cm$^2$. Nafion 117® membrane and DA75 membrane are tested under the following conditions: 80° C., C, $O_2$ at 150 sccm & 80° C., 20 psig., 0.5 M MeOH 7 ml/min.

Figure 10:
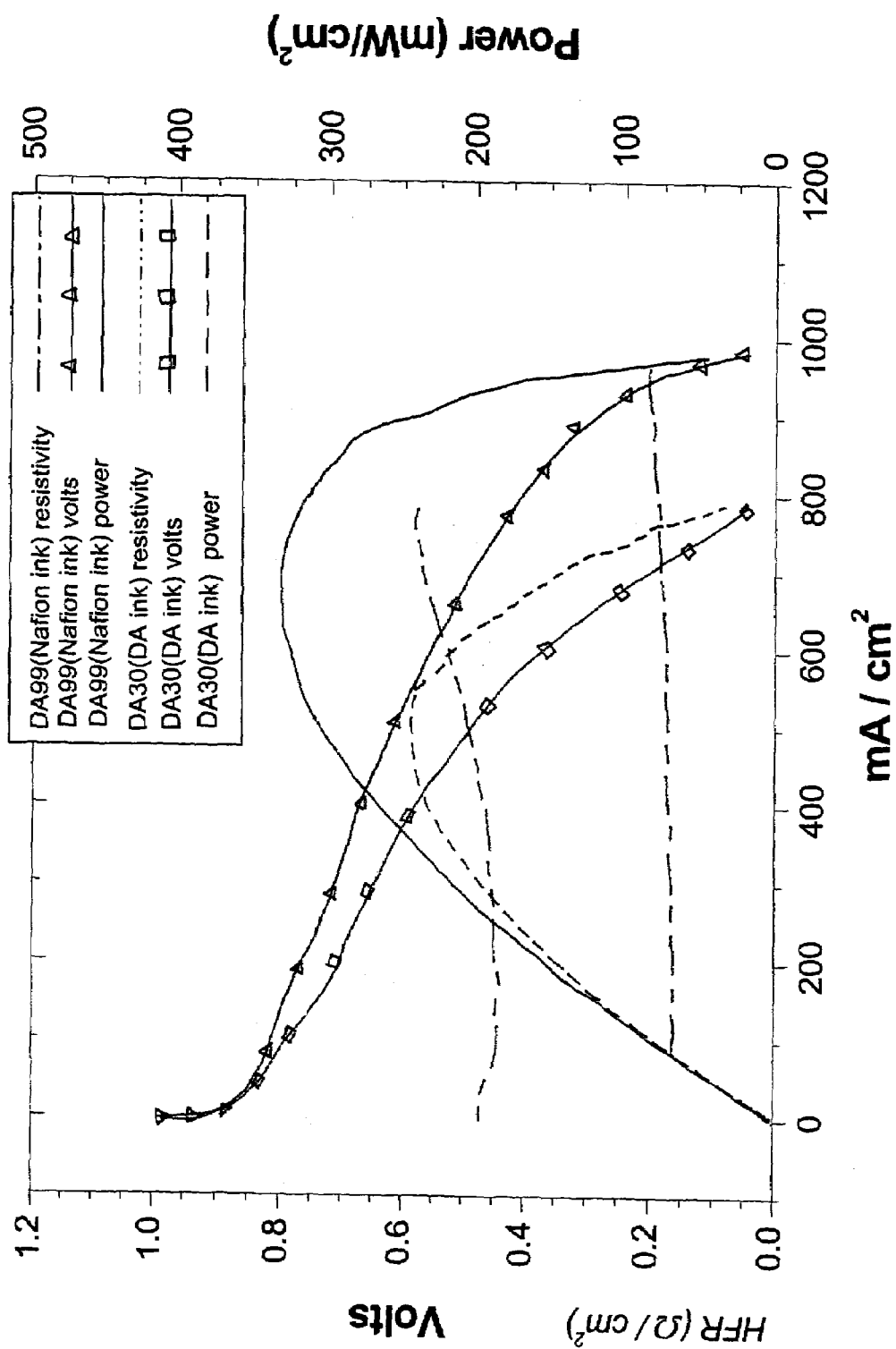
FIG. 10 illustrates polarization and power curves of nanocomposites of sulfonated polymer membrane and catalyst according to one embodiment of the present invention.

Preparation of catalyst electrodes has traditionally been achieved by preparing an ink or dispersion consisting of electrocatalyst (either Pt or Pt/Ru), and Nafion® (5% wt. solution dispersed in lower alcohol) and other additives which are well known to those in the art such as glycol, or water. The ink is applied to porous carbon support using a hot press technique or applied directly to the membrane surface using a painting technique. Referring now to FIG. 10, the performance for electrodes cast from an ink comprising SDAPP polymer deposited onto a polymer electrolyte membrane comprising SDAPP (of about 3 mil thickness) is illustrated as compared to electrodes cast from an ink comprising Nafion deposited onto a polymer electrolyte membrane comprising SDAPP at about 130° C., 85% RH, $H_2$ and $O_2$ are at 200 sccm and 20 psig (the data is not IR corrected). The polarization and power curves for SDAPP electrodes coupled to SDAPP membranes demonstrate sufficient gas permeation and working performance in a fuel cell. The electrode casting ink comprises a sulfonated polyphenylene polymer wherein the polymer has an IEC of between about 0.5 meq/g and 5.0 meq/g. In a preferred embodiment, the electrode casting ink comprises a sulfonated polyphenylene polymer wherein the polymer has an IEC of about 2.4 meq/g or above.

SDAPP dispersions for use as electrode inks but not limited to are produced by heating the SDAPP solid (IEC 1.5–5 meq/g) in boiling water for 2 hrs. Isopropanol is added to form an about 5–20 wt % SDAPP water/alcohol casting solution or dispersion. The casting solution may be dispersed by stirring, sonication or heating to form a substantially homogenous polymer solution. The casting solution is suitable for making electrodes with one or more electrocatalyst contained therein.

The sulfonated polyphenylenes of the present invention are also useful as battery separators, electrolytes for electrosynthesis cells, electrolytes for electrolysis cells, electrolytes for gas generating electrochemical systems, as ionic membranes in electrochemical sensors, as electrolytes in electrochemical scrubbers and other purification systems and as electrolytes in primary and secondary batteries.

It will be apparent to those skilled in the art that other types of equipment that record the necessary images may be employed and related statistical and analysis techniques may be used without departing from the scope of the invention as claimed. Further, the embodiments described herein are illustrative only and are not meant as limitations on the claims hereof.

What is claimed is:

1. A sulfonated polyphenylene polymer, derived by controllably sulfonating a polyphenylene polymer with a sulfonating agent, the sulfonated polyphenylene polymer having repeat units of the following structure 1:

Structure 1

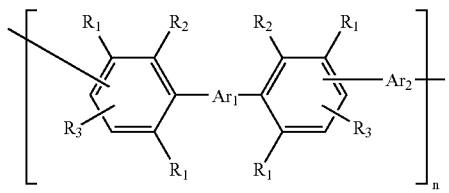

in which $R_1$, $R_2$ and $R_3$ are the same or different, wherein each $R_1$, $R_2$, and $R_3$ is H or an unsubstituted or inertly-substituted aromatic moiety;

$Ar_1$ and $Ar_2$ are the same or different, wherein each $Ar_1$ and $Ar_2$ is an unsubstituted aromatic moiety or inertly-substituted aromatic moiety;

wherein a pendant side chain of a sulfonyl group attaches to a carbon atom;

wherein from one to six sulfonyl groups are attached per repeat unit;

wherein $n \leq 2$; and wherein any combination of $R_1$, $R_2$ and $R_3$ and $Ar_1$ and $Ar_2$ comprises a sub-combination selected from the group consisting of:

a) $R_1$ is different than $R_2$,
b) $R_1$ is different than $R_3$,
c) $R_2$ is different than $R_3$,
d) $Ar_1$ is different than $Ar_2$, and
e) $R_1=R_2=R_3=Ar_1=Ar_2$.

2. The sulfonated polyphenylene polymer of claim 1, wherein $R_1=R_2=R_3=Ar_1=Ar_2$=phenyl.

3. The sulfonated polyphenylene polymer of claim 1, wherein $R_1=R_2=Ar_1=Ar_2$=phenyl, and $R_3$=H.

4. The sulfonated polyphenylene polymer of claim 1, wherein n ranges from about 130 to 300.

5. The sulfonated polyphenylene polymer of claim 1, wherein the sulfonyl groups are homogenously distributed in the polymer.

6. The sulfonated polyphenylene polymer of claim 1, wherein the polymer has a proton conductivity at 25° C. of about 10 mS/cm to about 125 mS/cm.

7. The sulfonated polyphenylene polymer of claim 1, wherein each aromatic moiety comprises a phenyl, a polyaromatic, or a fused aromatic moiety that is unsubstituted or inertly-substituted.

8. The sulfonated polyphenylene polymer of claim 7, wherein each aromatic moiety is selected from the group consisting of:

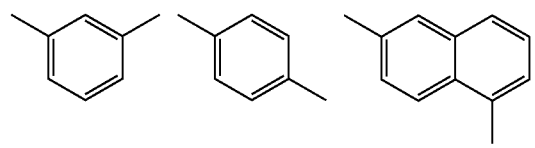

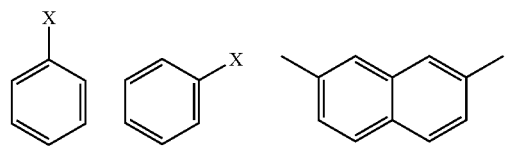

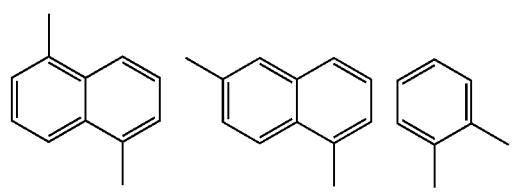

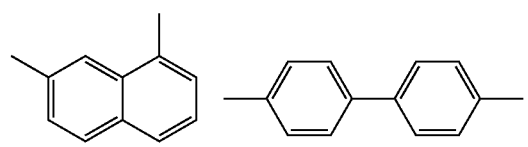

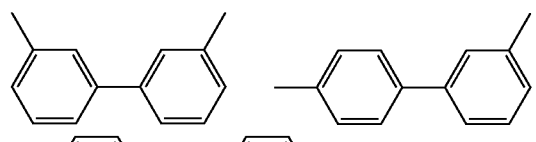

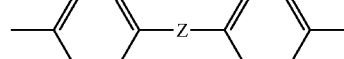

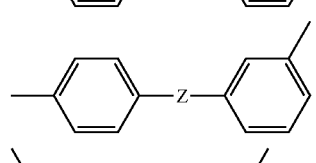

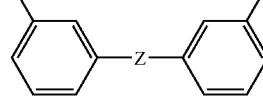

-continued
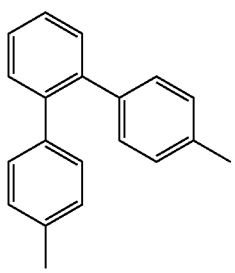 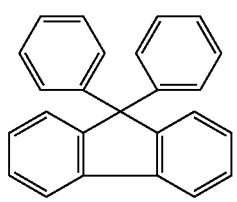
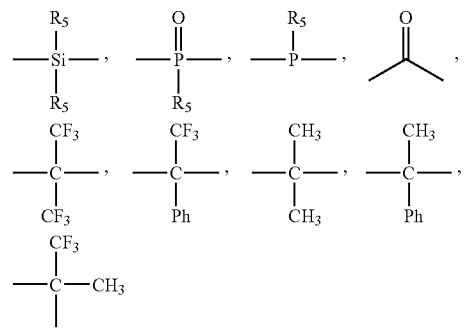
where each Z is selected from —O—, —S—, alkylene, —CF$_2$—, —CH$_2$—, —O—CF$_2$—, perfluoroalkyl, perfluoroalkoxy,
where R$_5$ is selected from —H, —CH$_3$, —CH$_2$CH$_3$, —(CH$_2$)CH$_3$, or Ph; and
wherein x=CH$_3$, CEt$_3$, CMe$_3$, CF$_3$, NMe$_2$, NH$_2$, F, Cl, Br, OCH$_3$, OH, OCF$_3$, O-Ph, Ph, and SO$_3$R$_5$.
* * * * *

UNITED STATES PATENT AND TRADEMARK OFFICE
CERTIFICATE OF CORRECTION

PATENT NO. : 7,301,002 B1 Page 1 of 1
APPLICATION NO. : 10/938137
DATED : November 27, 2007
INVENTOR(S) : Christopher J. Cornelius, Cy H. Fujimoto and Michael A. Hickner It is certified that error appears in the above-identified patent and that said Letters Patent is hereby corrected as shown below:

Column 17, line 55, the line should appear as follows:

-- wherein $n \geq 2$; and --

Signed and Sealed this

Seventh Day of April, 2009

JOHN DOLL
*Acting Director of the United States Patent and Trademark Office*